(12) United States Patent
Selg et al.

(10) Patent No.: US 6,236,639 B1
(45) Date of Patent: May 22, 2001

(54) CARTRIDGE FOR DISK-SHAPED STORAGE MEDIUM HAVING NOVEL INTERNAL WALLS

(75) Inventors: Donald W. Selg, Mendota Heights; John F. Fairchild, Hugo; Steven E. Turch, Blaine; Walter J. Halberg, Ramsey, all of MN (US)

(73) Assignee: Imation Corp., Oakdale, MN (US)

( * ) Notice: Subject to any disclaimer, the term of this patent is extended or adjusted under 35 U.S.C. 154(b) by 0 days.

(21) Appl. No.: 08/431,779

(22) Filed: May 1, 1995

(51) Int. Cl.⁷ .............................. G11B 19/00; G11B 23/03
(52) U.S. Cl. .................. 369/291; 360/133; 206/308.1
(58) Field of Search ................ 369/291; 360/132, 360/133; 242/347; 206/308.1, 308.3

(56) References Cited

U.S. PATENT DOCUMENTS

| | | | |
|---|---|---|---|
| 4,012,011 | * | 3/1977 | Saito ..................... 242/344 |
| 4,564,878 | * | 1/1986 | Weavers et al. ............ 360/132 |
| 4,566,653 | | 1/1986 | Bettinger et al. ........... 242/347.2 |
| 4,894,673 | | 1/1990 | Beach ..................... 354/275 |
| 5,199,593 | | 4/1993 | Kita ...................... 220/359 |

FOREIGN PATENT DOCUMENTS

| | | | |
|---|---|---|---|
| 93 01 906 | | 5/1993 | (DE) . |
| 2 210 022 | * | 6/1989 | (GB) .................... 360/132 |
| 6-84267 | * | 3/1994 | (JP) ..................... 369/291 |

* cited by examiner

*Primary Examiner*—William Klimowicz
(74) *Attorney, Agent, or Firm*—Eric D. Levinson

(57) ABSTRACT

A cartridge for a disk-shaped storage medium, wherein the cartridge has partition walls within the cartridge for separating the storage medium from other portions of the cartridge, thereby protecting the storage medium from damage due to debris particles. The partition walls are formed by ribs which protrude from the interior surfaces of each half of the cartridge. The ribs do not meet but rather define a small gap between them. The top of one rib has a V-shaped protrusion (taken perpendicular to the length of the rib) while the top of the other rib has a complementary V-shaped groove. Elongate debris particles are blocked from passage into the compartment containing the storage medium due to the tortuous path defined by the gap.

5 Claims, 2 Drawing Sheets

CARTRIDGE FOR DISK-SHAPED STORAGE MEDIUM HAVING NOVEL INTERNAL WALLS

FIELD OF THE INVENTION

The present invention relates generally to cartridges for disk-shaped storage media, and more particularly to partitions within such cartridges for enclosing the media in a compartment which protects it from external debris.

BACKGROUND OF THE INVENTION

Disk-shaped data storage media, such as magnetic diskettes and certain types of optical storage discs, e.g., magneto-optic disks, are typically protected by enclosures, or cartridges, which reduce contamination to the disk due to dust and debris. Such enclosures typically provide apertures covered by sliding shutters to allow access to the media by a disk drive.

As shown in FIG. 1, a disk-shaped storage medium 40 is usually protected by an upper cartridge shell 12 and a lower cartridge shell 14 which fit together to form a complete cartridge 10. A drive may gain access to media 40 by sliding shutter 16 on cartridge 10 to an open position. Partitions are provided within the cartridge 10 to subdivide the enclosed space into various compartments. The partitions are typically formed by ribs which are provided on the interior surfaces of shells 12 and 14. Typically, each rib has a height equal to about half of the distance between the interior surfaces of shells 12 and 14 when the cartridge 10 is assembled. The ribs are aligned so that they mate with each other to form compartments within cartridge 10. Ribs 20 and 22 form a compartment 30 that separates medium 40 from compartments 18.

As shown in FIGS. 1 and 2, a compartment 30 is a circular space bounded by interior surface 15 of lower cartridge shell 14 and the interior surface of upper cartridge shell 12, and is within the circular boundary defined by ribs 20 and 22. Compartment 30 may further include a rib 24 on interior surface 15 of lower cartridge shell 14 which defines a circular boundary concentric with rib 22 for supporting medium 40 in an outer circumferential area 42 of the medium which is not intended to store data. Compartment 30 may also include yet another rib 26 on interior surface 15 of lower cartridge shell 14 which defines a circular boundary concentric with rib 22 for supporting medium 40 in an inner circumferential area 46 of the medium which is not intended to store data.

Rib 22 defines the circumferential boundary of the lower portion of compartment 30. The radius of the boundary is slightly greater than that of medium 40.

A cross-sectional view of ribs 20 and 22, taken along line 3–3' in FIG. 1, is shown as FIG. 3. Rib 22 extends upward from interior surface 15 of lower cartridge shell 14 and rib 20 extends downward from interior surface 13 of upper cartridge shell 12 to form a smooth continuous wall when the upper and lower cartridge shells are assembled as cartridge 10. Ribs 20 and 22 may be of a precisely determined height that allows them to contact at their tops at interface 38, thereby forming continuous rib wall separating compartment 30 housing media 40 from compartments 18. In the alternative, a small gap may be provided at interface 38, as shown in FIG. 3.

Rib walls which contact each other at their tops suffer, however, from the disadvantage of requiring very tight manufacturing tolerances, since the rib edge surfaces forming interface 38 must be in close proximity to each other, yet must have very limited interference to avoid causing a deformation of upper and lower cartridge shells 12 and 14 at locations 50 and 52, respectively, which might result in unsightly bulges or cause cartridge 10 to malfunction. Alternatively, if a gap is provided between the two rib tops, debris particles may be able to migrate through the gap and onto medium 40.

Drives for reading and/or writing data on disk-shaped optical storage media have error detection and correction codes (EDCC) incorporated in the drives' system electronics and firmware which allows for a potential loss of data bits by decoding them within the context of the retrievable data. However, should too many consecutive bits of data be lost due to a large debris particle or an accumulation of smaller debris particles, the EDCC system would be unable to decode the lost data. As new media products having increased storage density per unit area of media are developed, the newer media is increasingly sensitive to debris accumulation and smaller debris particles because of the closer spacing of the data bits.

An alternative prior art rib configuration is shown in cross-section in FIG. 4. Rib 20' has a notch on one side of its top, causing the rib to be higher on one side than the other. Rib 22' is notched in a complementary fashion, so that the extended portion 62 of rib 20' mates with the shorter portion of rib 22', and the extended portion 64 of rib 22' mates with the shorter portion of rib 20'. This overlapping design is less sensitive to manufacturing tolerances and thus allows for a relatively wide dimensional variation without causing noticeable deformation of the cartridge at locations 50 and 52. This configuration also provides a gap that is more convoluted, thereby making it more difficult for debris particles to pass through the gap.

If cartridge 10 is to be formed by the injection molding of a thermoplastic material, it is desirable that ribs 20' and 22' be relatively thin, since ribs that are thicker than the wall from which they extend can cause defects, called sink marks, at locations 50 and 52 of the cartridge. However, due to the configuration shown in FIG. 4, ribs 20 and 22 must be even thinner at their top portions 62 and 64, respectively. This makes the ribs difficult to fill during molding.

A second alternative prior art rib configuration is shown in FIG. 5. Ribs 20' and 22" resemble ribs 20' and 22' of FIG. 4, but differ in that they have a more gradual transition between the shorter and longer portions, 62' and 64', respectively, of the ribs. This design suffers from some of the same disadvantages as the rib configuration of FIG. 4.

SUMMARY OF THE INVENTION

Accordingly, the present invention provides a configuration for mating partition ribs which gives effective protection from media contamination by debris in the size range to which the particular media is susceptible, while at the same time providing a cartridge which can be easily produced by injection of a thermoplastic material by allowing easy and defect-free filling of the rib portions of the cartridge.

Accordingly, the present invention is directed to a cartridge for data storage media, e.g., disk-shaped recording media, having two cartridge shell halves, each of which has a rib on one surface thereof One rib has a groove in the top of the rib which extends along the length of the rib, while the other rib has a protrusion on the rib top which extends along the length of that rib. When the cartridge shells are assembled together, the two ribs are aligned so that the protrusion in one rib is aligned with and extends into the groove of the other rib. The tops of the two ribs define a gap between them. The gap entrance preferably has a nominal thickness of less than 0.2 mm, and more preferably about 0.1 mm. The ribs preferably have thicknesses of about 0.86 to 1.22 mm, measured radially.

The protrusion and groove are preferably of complementary shape. In one embodiment, the protrusion and groove are V-shaped and are provided along the centerlines of the ribs. The two ribs are aligned to form a rib wall which creates a compartment that separates the disk-shaped storage medium from the rest of the cartridge interior. This wall prevents debris such as dust particles from entering the media storage compartment.

DETAILED DESCRIPTION

Figure 6:
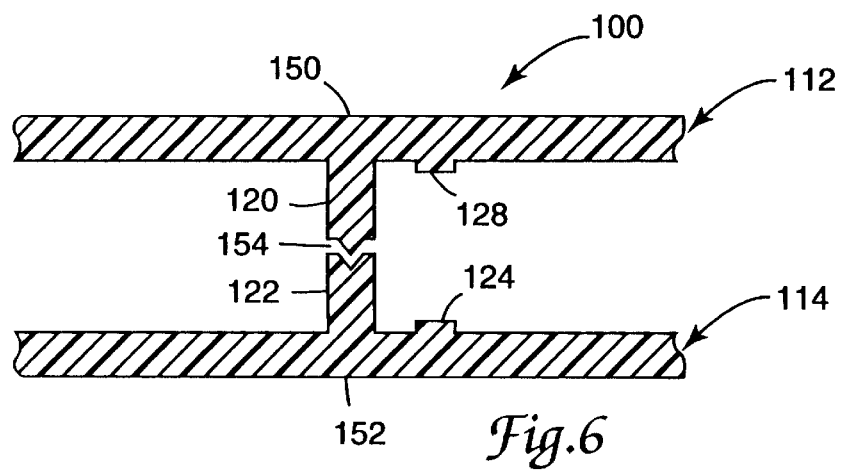
FIG. 6 is a schematic cross-sectional view of internal ribs according to one embodiment of the present invention.

A portion of a 130 mm magneto-optical disc cartridge 100 according to the present invention is shown in FIG. 6. Cartridge 100 is comprised of an upper cartridge shell 112 and a lower cartridge shell 114. Like prior art cartridge 10, ribs 124 and 128 on the interior surfaces of cartridge shells 112 and 114, respectively, serve to support the outer circumference of a disk-shaped storage medium (not shown). And like prior art cartridge 10, cartridge 100 has a rib wall forming a compartment separating the storage medium from the rest of the interior of the cartridge.

The rib wall is formed from two ribs: one rib 120 which extends from the interior-facing surface of upper cartridge shell 112 and a second rib 122 which extends from the interior-facing surface of lower cartridge shell 114. Like the rib walls described in the prior art, the ribs 120 and 122 are aligned with each other. Ribs 120 and 122 preferably define a gap 154 between them.

Preferred materials for cartridge shells 112 and 114 include polycarbonates, such as high-flow polycarbonates. Ribs 120 and 122 should have a thickness equal to about 50–80 % of the thickness of the walls of cartridge shells 112 and 114, respectively, so as to minimize sink due to molding at points 150 and 152 on the cartridge shells.

Figure 1:
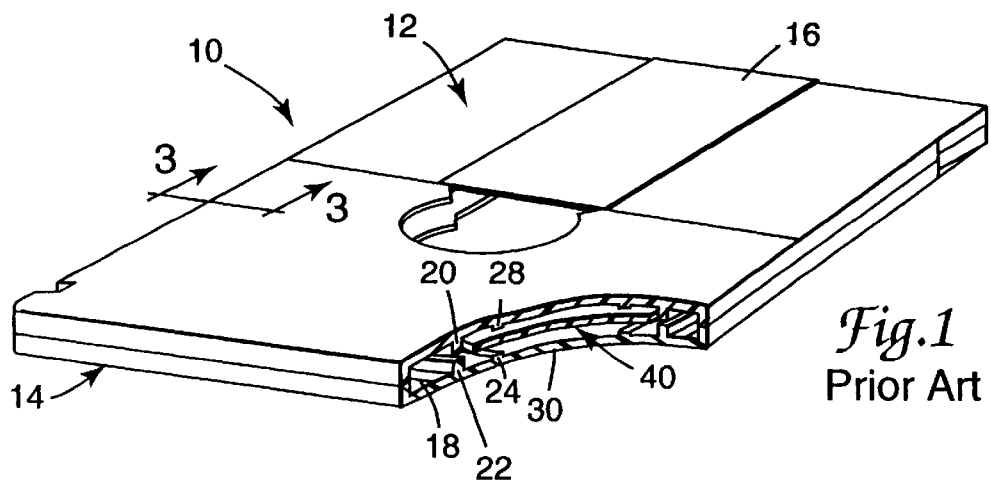
FIG. 1 shows a broken away perspective view of a prior art cartridge for disk-shaped storage media.
Figure 2:
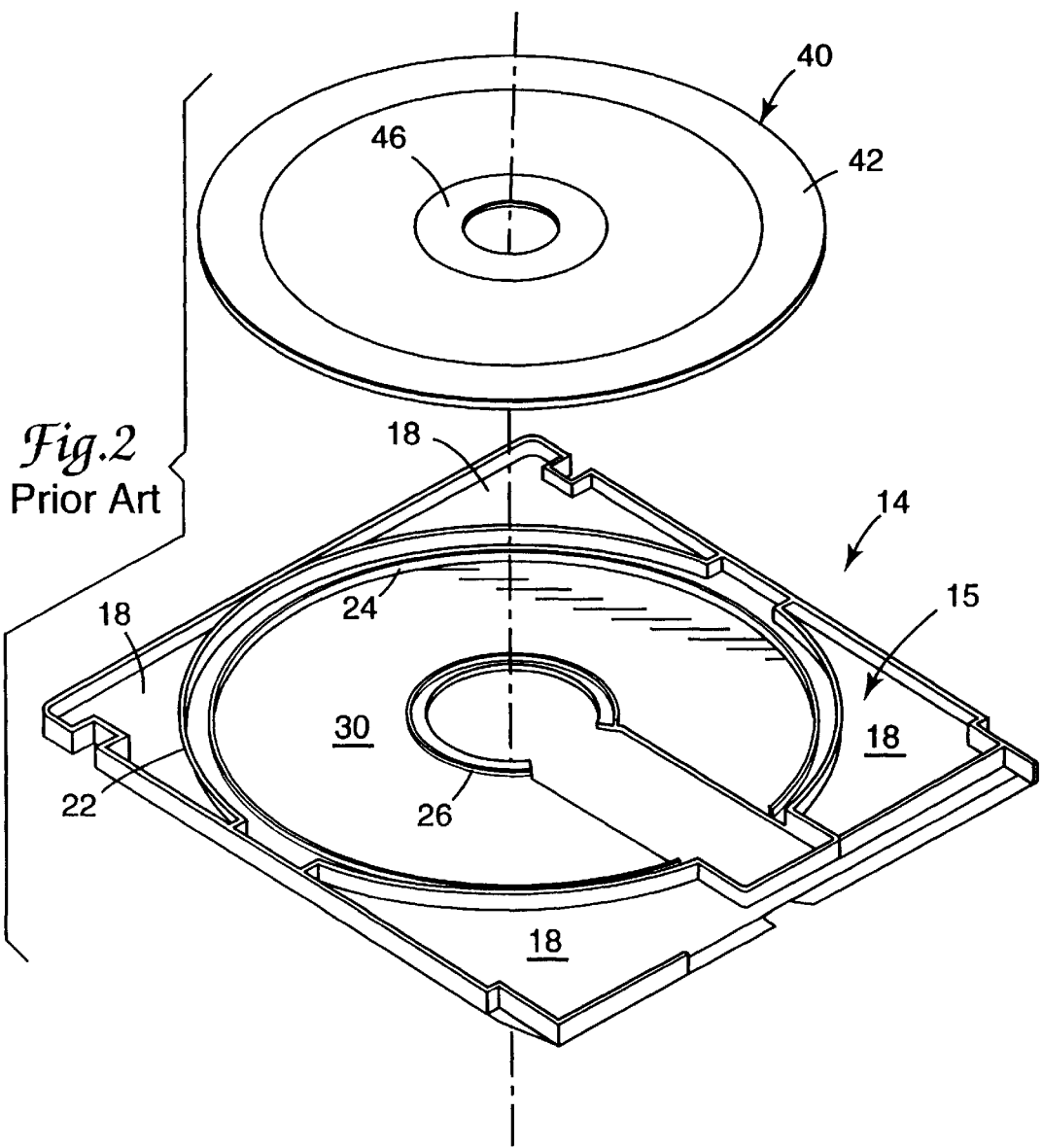
FIG. 2 is an exploded schematic view of the prior art cartridge of FIG. 1.
Figure 3:
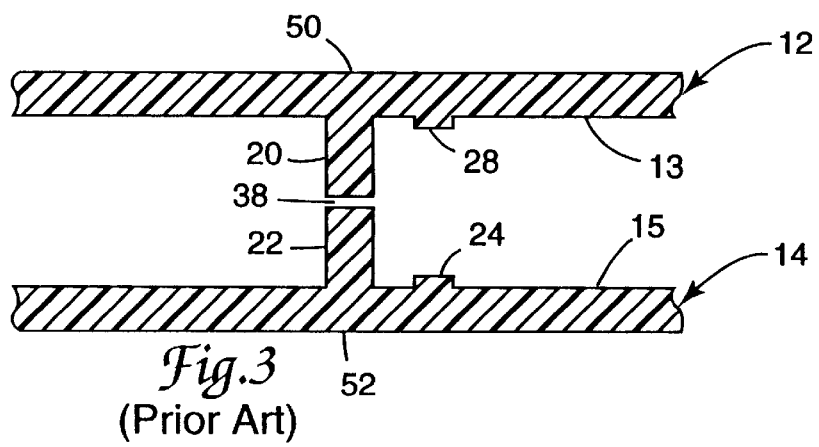
FIG. 3 is a schematic cross-sectional view taken along line 3–3' in FIG. 1 of mating internal ribs according to the prior art.
Figures 4, 5, 7:
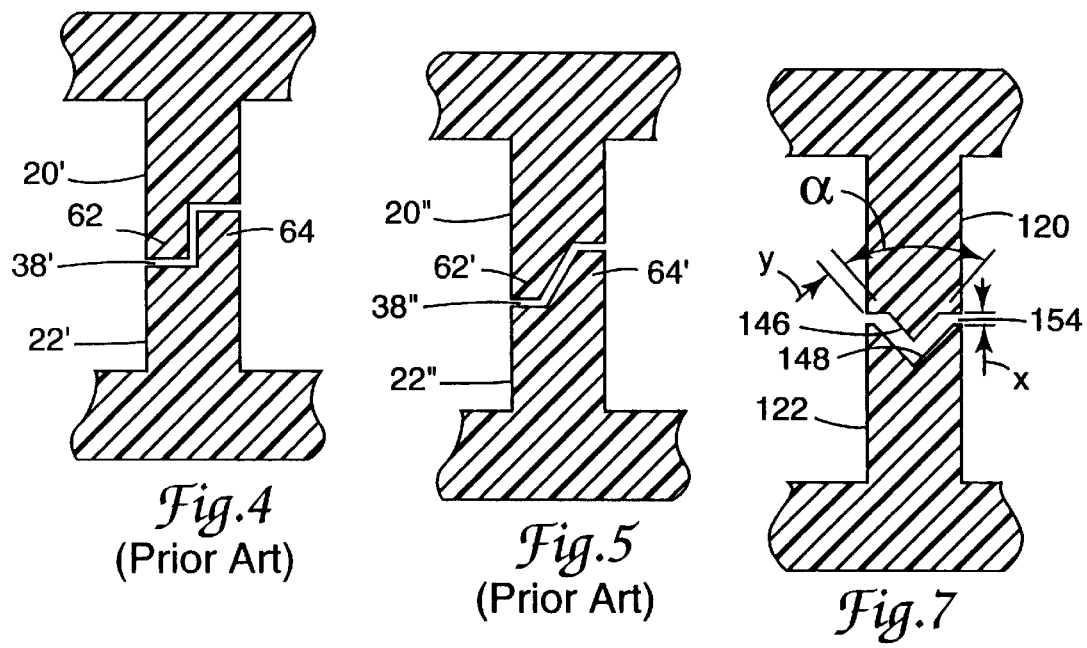
FIG. 4 is a schematic cross-sectional view taken along line 3–3' in FIG. 1 of mating internal ribs according to another embodiment in the prior art.
FIG. 5 is a schematic cross-sectional view taken along line 3–3' in FIG. 1 of making internal ribs according to yet another embodiment in the prior art.
FIG. 7 is a close-up of a portion of FIG. 6.

A close-up, schematic, cross-sectional view of the rib wall is shown in FIG. 7. The spacing between ribs 120 and 122 has been exaggerated for purposes of illustration. The shape of gap 154 is determined by the shape of protrusion 146 of rib 120, the shape of groove 148 in rib 122, and the spacing between the two rib tops. Protrusion 146 and groove 148 should be shaped and spaced from each other so that a debris particle traveling from outside the media compartment (to the left of the rib walls as shown in FIG. 7) into the media compartment must change direction at least once while traveling through gap 154, i.e., the gap must define a tortuous path. Furthermore, many debris particles are not spherical in shape but rather have a length that is large compared with their width (or thickness). Such elongate particles would have great difficulty passing through the tortuous path defined by the gap, and might become lodged within the gap. This has the added advantage of tending to block the passage of other debris particles through the gap.

In a preferred embodiment of the present invention, protrusion 146 on rib 120 has an external "V" shaped cross-section taken perpendicular to its length, while groove 148 in rib 122 has a complementary internal "V" shaped cross-section taken perpendicular to its length. Of course, those skilled in the art will appreciate that the terms "upper" and "lower" to describe the cartridge shells are arbitrarily chosen for reference to the drawings.

In one preferred embodiment, the width of gap 154 at the point between protrusion 146 and groove 148 is greater than the width of the gap at the edges of ribs 120 and 122. This is done to allow for horizontal movement of the tips of the two ribs at the gap. Gap 154 has a width, x, at the entrances of the gap of less than 0.2 mm, and more preferably has a width of about 0.1 mm. The nominal dimension of 0.1 mm allows for manufacturing tolerances to range from a gap of about almost 0 mm (zero gap) to about 0.2 mm. Gap 154 has a width, y, separating protrusion 146 and groove 148 of about 0.2 mm±0.1 mm. Ribs 120 and 122 preferably have a width of about 0.86 to 1.22 mm. When gap 154 is of about 0.1 mm or less, and ribs 120 and 122 have the widths given above, dust and debris in the size range which would be harmful to the function of storage disks are effectively blocked.

The V-shaped cross-section of protrusion 146 preferably has an interior angle α of about 100°. Angle α may be greater than 100°, provided that there is sufficient overlap in the engagement of protrusion 146 and groove 148 to provide the requisite tortuosity of path for any debris particles which encounter gap 154. Alternatively, having angle α less than 100° has the advantage of requiring any debris particles passing through gap 154 to turn a sharper corner at the tip of protrusion 146, thereby increasing the effectiveness of the debris-blocking function. However, as angle α is decreased, an important aspect of the invention is diminished, namely the moldability of ribs 120 and 122. An important aspect of the invention is that ribs 120 and 122 engage in a debris-blocking manner without requiring that the ribs have excessively thin cross-sections. Clearly, greatly decreasing angle α would increase the length of the reduced cross-sectional area portions of the ribs relative to the length of the ribs.

The actual shape of the cross-sections of protrusion 146 and groove 148 may be altered to accommodate available manufacturing tools. For example, the tip of protrusion 146 could be rounded.

Similarly, while the base of protrusion 146 is shown as being about one-half the width of rib 120, the base of the protrusion might be narrower or wider, e.g., the base of the protrusion could extend across the entire width of the rib, so that the top of the rib had a triangular shape. Of course, groove 148 in rib 122 could similarly be shaped in a complementary fashion.

Alternatively, additional protrusions and complementary grooves may also be provided, so that there are two or more parallel protrusions extending along the tops of rib 120. If a pair of protrusions were used, then protrusion 146 would have a "W" shaped cross-section, instead of a V-shaped cross-section, as would groove 148.

Although the present invention has been described with reference to a 130 mm magneto-optical disc, the invention has application to other recordable optical discs, such as 90 mm magneto-optical discs. Those skilled in the art will appreciate that the present invention may also have utility for other disc-shaped media, such as pre-recorded optical discs and magnetic diskettes.

What is claimed is:

1. A cartridge for a disk-shaped storage medium comprising:
   a first cartridge shell having a first rib on an interior surface thereof, the first rib having a top having a groove therein extending alone the length of the first rib; and
   a second cartridge shell having a second rib on an interior surface thereof, the second rib having a top having a protrusion therefrom extending along the length of the second rib;
   wherein the first and second cartridge shells are assembled together with their interior surfaces facing each other, wherein the two ribs are aligned with each other so that the protrusion from the second rib is aligned with and extends into the above in the first rib, and wherein the tops of the first and second ribs define a gap between them so that the two ribs are not secured to each other, wherein the gap has an entrance having a width less than 0.2 mm.

2. A cartridge for a disk-shaped storage medium, comprising:
   a first cartridge shell having a first rib on an interior surface thereof, the first rib having a top having a groove therein extending along the length of the first rib; and
   a second cartridge shell having a second rib on an interior surface thereof, the second rib having a top having a protrusion therefrom extending along the length of the second rib;
   wherein the first and second cartridge shells are assembled together with their interior surfaces facing each other, wherein the two ribs are aligned with each other so that the protrusion from the second rib is aligned with and extends into the above in the first rib, and wherein the tops of the first and second ribs define a gap between them so that the two ribs are not secured to each other, further comprising a disk-shaped storage medium provided within the cartridge, wherein the two ribs form a rib wall defining a compartment which separates the disk-shaped storage medium from other portions of the cartridge interior, and wherein the gap is sufficiently small to prevent dust particles from entering the compartment.

3. A cartridge for a disk-shaped medium, comprising:
   a first cartridge shell having a first rib on an interior surface thereof, the first rib having a top having a V-shaped groove therein extending along the length of the first rib and positioned alone a centerline of the first rib top; and
   a second cartridge shell having a second rib on an interior surface thereof, the second rib having a top having a V-shaped protrusion thereon extending along the length of the second rib and positioned along a centerline of the second rib top;
   wherein the first and second cartridge shells are assembled together with their interior surfaces facing each other, wherein the two ribs are aligned with each other so that the protrusion from the second rib is aligned with and extends into the groove in the first rib, and wherein the tops of the first and second ribs define a gap between them so that the two ribs are not secured to each other, further comprising a disk-shaped storage medium provided within the cartridge, wherein the two ribs form a rib wall defining a compartment which separates the disk-shaped storage medium from other portions of the cartridge interior, and wherein the gap is sufficiently small to prevent dust particles from entering the compartment.

4. The cartridge of claim 3, wherein the gap has an entrance having a width of less than about 0.2 mm.

5. The cartridge of claim 3, wherein the gap has an entrance having a nominal width of about 0.1 mm.

* * * * *

UNITED STATES PATENT AND TRADEMARK OFFICE
CERTIFICATE OF CORRECTION

PATENT NO.      : 6,236,639 B1
DATED           : May 22, 2001
INVENTOR(S)     : Selg et al.

It is certified that error appears in the above-identified patent and that said Letters Patent is hereby corrected as shown below:

Column 5,
Line 15, delete "alone" and insert in place thereof -- along --.
Line 25, delete "above" and insert in place thereof -- groove --.

Column 6,
Line 3, delete "above" and insert in place thereof -- groove --.
Line 16, delete "alone" and insert in place thereof -- along --.

Signed and Sealed this

Twenty-third Day of April, 2002

*Attest:*

*Attesting Officer*

JAMES E. ROGAN
*Director of the United States Patent and Trademark Office*